(12) United States Patent
Kolacinski et al.

(10) Patent No.: US 9,569,615 B2
(45) Date of Patent: *Feb. 14, 2017

(54) CYBER SECURITY

(71) Applicants: Richard M. Kolacinski, South Euclid, OH (US); Barry D. Angeline, Asbum, VA (US); Kenneth A. Loparo, Chesterland, OH (US)

(72) Inventors: Richard M. Kolacinski, South Euclid, OH (US); Barry D. Angeline, Asbum, VA (US); Kenneth A. Loparo, Chesterland, OH (US)

(73) Assignee: Cyberricade, Inc., Ashburn ( * ) Notice: Subject to any disclaimer, the term of this patent is extended or adjusted under 35 U.S.C. 154(b) by 0 days.

This patent is subject to a terminal disclaimer.

(21) Appl. No.: 15/152,702

(22) Filed: May 12, 2016

(65) Prior Publication Data

US 2016/0253495 A1    Sep. 1, 2016

Related U.S. Application Data

(63) Continuation of application No. 14/211,909, filed on Mar. 14, 2014, now Pat. No. 9,367,683.

(60) Provisional application No. 61/789,728, filed on Mar. 15, 2013.

(51) Int. Cl.
G06F 21/00    (2013.01)
G06F 21/55    (2013.01)
G06F 21/57    (2013.01)
G06N 7/00    (2006.01)
G06N 99/00    (2010.01)

(52) U.S. Cl.
CPC ............ *G06F 21/552* (2013.01); *G06F 21/55* (2013.01); *G06F 21/577* (2013.01); *G06N 7/005* (2013.01); *G06N 99/005* (2013.01); *G06F 2221/034* (2013.01)

(58) Field of Classification Search
CPC ...... G06F 21/552; G06F 21/55; G06F 21/577; G06F 2221/034; G06N 7/005; G06N 99/005
See application file for complete search history.

(56) References Cited

U.S. PATENT DOCUMENTS 8,091,093 B2 *   1/2012   Huntsman ........... H04L 63/1408
                                                                              709/223
2010/0042563 A1 *   2/2010   Livingston ........... G06K 9/6226
                                                                              706/12

(Continued)

*Primary Examiner* — Samson Lemma
*Assistant Examiner* — Narciso Victoria
(74) *Attorney, Agent, or Firm* — Walter | Haverfield LLP; James J. Pingor

(57) ABSTRACT

Systems and methods that use probabilistic grammatical inference and statistical data analysis techniques to characterize the behavior of systems in terms of a low dimensional set of summary variables and, on the basis of these models, detect anomalous behaviors are disclosed. The disclosed information-theoretic system and method exploit the properties of information to deduce a structure for information flow and management. The properties of information can provide a fundamental basis for the decomposition of systems and hence a structure for the transmission and combination of observations at the desired levels of resolution (e.g., component, subsystem, system).

18 Claims, 6 Drawing Sheets

(56) References Cited

U.S. PATENT DOCUMENTS

2013/0305357 A1* 11/2013 Ayyagari ............... H04L 63/14
                                                        726/22
2013/0312092 A1* 11/2013 Parker ................ H04L 63/1408
                                                        726/22

* cited by examiner

Normal Steady State Behavior

Abnormal Transient Behavior

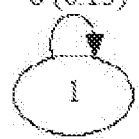
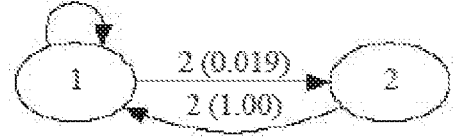
(a) Normal, steady state behavior
(b) Abnormal transient behavior
FIG. 5A
FIG. 5B

CYBER SECURITY

CROSS-REFERENCE TO RELATED APPLICATIONS

This application is a continuation of, and claims priority to the pending U.S. patent application Ser. No. 14/211,909 entitled Cyber Security and filed Mar. 14, 2014 which claims the benefit of U.S. Provisional Patent application Ser. No. 61/789,728 entitled Cyber Security filed Mar. 15, 2013. The entirety of the above-noted applications are incorporated by reference herein.

BACKGROUND

The development of successful cyber security systems for intrusion and malicious activity detection involves the ability to fuse information from many disparate sources at multiple levels of a system, potentially from deep packet analysis to traffic analysis within and between networks. While the large volume of transactions to be considered provides a vast amount of data for the inference of models and the collection of statistically significant samples, it also offers substantial cover for bad actors making the identification of intrusions and malicious activity akin to finding the proverbial needle in a haystack.

Problems associated with the detection of cyber attacks are compounded when it comes to cyber-physical systems that integrate computational, networking, and physical processes. Cyber-physical systems are engineered systems that are built from and depend upon the synergy of computational and physical components. Computers and networks monitor and control the physical processes, with feedback loops where physical processes affect computations and vice versa. Examples of the many CPS application areas include the smart electric grid, smart transportation, smart buildings, smart medical technologies, next-generation air traffic management, and advanced manufacturing The physical dynamics of cyber-physical systems may be exploited to either mount or obscure an attack. Our nation's critical infrastructure includes many large-scale, complex cyber-physical systems. For example, the modernization of electric power transmission systems has included the implementation of new sensors, control actuators and a communications network overlay on legacy power systems for monitoring and control.

Compound cyber-physical electric power generation and transmission systems are susceptible to both physical and cyber attacks. For instance synchrophasors, phase measurement units synchronized using GPS time to monitor voltage angles at points separated by large distances, are susceptible to GPS time spoofing. The communication network transmissions of the synchrophasor observations can also be maliciously corrupted. Thus, data can be corrupted at the source, or in transmission, to induce dangerous control actions potentially resulting in the destabilization of power generation and distribution systems.

A related issue is that the power generation and distribution systems are also needed to power the monitoring and control systems. Thus, the effects of local disturbances are tremendously amplified when the monitoring and control resources for larger areas are taken off-line.

Cyber physical systems typically comprise a large number of disparate components, where the number of interactions between components can increase exponentially with the number of components. The intentional corruption of phase measurement data, as well as other forms of deliberate exploitation, often cannot be identified by conventional analysis of network traffic or condition monitoring of sensors. In many cases, cyber and/or physical attacks are indistinguishable from expected behavior when viewed using traditional observation approaches and processes which typically have a very local scope based on limited sensing. However, malicious attacks, particularly cyber attacks focused on corrupting data do not, in general, do so in a way that is physically consistent with other, non-corrupted sources of information. Cyber and/or physical attacks can become distinguishable from naturally occurring behavior when observations are interpreted in a broader context embedding the physical constraints inherent in system dynamics considered over a larger (potentially global) spatiotemporal domain.

Traditional analysis tools are unable to cope with the full complexity of cyber-physical systems or adequately predict system behavior. The present electric power grid has experienced blackouts over large regions, tripped by minor events that escalate with surprising speed into widespread power failures. Even minor changes to consumer devices, such as air conditioners, have been shown to affect behavior of the power grid. For example, a recent event was caused by a low-cost relay that took longer to close in conditions that stalled the air conditioning unit's compressor pump motor. The aggregate effect of multiple air conditioning units having stalled motors caused an inductive load, causing voltage sag, that in turn stalled more pump motors leading to a voltage collapse. This illustrates the limitations of the current technology.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

Systems and methods that use probabilistic grammatical inference and statistical data analysis techniques to characterize the behavior of systems in terms of a low dimensional set of summary variables and, on the basis of these models, detect abnormal behaviors are discussed.

The disclosed information-theoretic system and method exploit the properties of information to deduce a structure for information flow within the system and to manage the process of information extraction. The properties of information can provide a fundamental basis for the decomposition of systems and hence a structure for the transmission and combination of observations at the desired levels of resolution (e.g., component, subsystem, system). The generalization of information theory to n-dimensions (an arbitrary number of dimensions) can be viewed as a statistical analysis tool for understanding systems in terms of the information geometry of its variables. Information measures can be interpreted as a statistical analysis tool. The generalization to n dimensions provides the wherewithal to apply these techniques to multivariable systems of arbitrary dimension.

Major advantages of the information theoretic approach over traditional statistical analysis techniques include 1) the measurement and analysis of rates of constraints, or correntropic functions (i.e., conditioned on history), 2) robustness to nonlinearity and 3) a robust means for system decomposition follows from the decomposition of constraints provided by the axiomatic properties of information (i.e., additivity and branching).

Information theory provides much of the mathematical underpinnings for the tools, techniques, and algorithms used in the disclosed system and method, for example, to model and monitor complex cyber-physical systems. A unifying mathematical framework has been developed, using information theory (classical and algorithmic) and thermodynamic formalism, that enables disparate elements of a cyber-physical system to be modeled jointly in a manner that captures their interaction and engenders a deeper understanding of cyber-physical system at multiple spatio-temporal levels.

Fuzzy measure theory may be used to embed multiple theories of uncertainty, in addition probability theory provides intrinsic mechanisms for capturing both epistemic and aleatoric uncertainty including that associated with system parameterization, emergent endogenous behaviors, and exogenous environmental disturbances.

In an embodiment, mechanisms for metrizing the transactional dynamics associated with many communication systems (e.g., Ethernet) can be provided utilizing, for example, probabilistic measures and differential geometry to construct a metrization. In further embodiments, the properties of fuzzy measures including non-probabilistic measures and probability measures (e.g. graded possibility measures) can be used to construct a de facto metrization.

Diffusion map techniques for manifold learning use the fact that observations will be dense on the true manifold on which dynamics evolve. By extension, a bijective mapping of non-metric variables into a metric space will then be amenable to a similar analysis, where the "true" manifold based on density of the observations captures nearness, thus the combination of the diffusion map technique and bijective maps may be used for metrization.

In conjunction with the techniques of symbolic dynamics used to discretize continuous dynamics, metrization can enable various types of cyber-physical system dynamics, continuous, discrete, and transactional, to be addressed within a common topological space. The application of the thermodynamic formalism enables the development of summary variables and associated models that are analogous to natural thermodynamic variables such as temperature and pressure and thus can convey a visceral interpretation that facilitates human/cyber-physical system interactions, as well as provide a meaningful collection of summary variables that capture the system's behavior in a low dimensional space.

In an embodiment, an information theoretic sensing and control framework that encompasses distributed software agents and computational methods to maximize the collection, transmission, aggregation, and conversion of data to actionable information for monitoring, diagnosis, prognosis and control of power plants is disclosed.

While for purposes of illustration, the disclosed method and system are described in terms of applicability to cyber-physicals systems, for example a power grid, the disclosed method and system can be useful for detecting abnormal behaviors in most any system where the properties of information can be exploited to deduce a structure for information flow within the system and to manage the process of information extraction.

In an embodiment, the disclosed method and system can be used for the prediction and detection of Improvised Explosive Devices (IEDs). In both peacekeeping and minor conflict operations, securing a safe environment for both an indigenous population and security protection forces is increasingly challenged by irregular terrorist tactics. In particular, improvised explosive devices (IEDs) as roadside bombs, vehicle borne improvised explosive devices (VBIEDs), and suicide bombers (IED vests) have become popular insurgent weapons. IEDs are a powerful terrorist weapon because of the effective local psychological impact, media attention, ease of construction, and difficulty in detecting IED operations.

Data can be collected from, for example, observable quantities, field measurements, road sensors, detection of radio frequency (RF) signatures, airborne imaging, roadside camera, tracking, and other identification systems. Data can be collected from local acoustic, seismic or RF sensors and remote nuclear, chemical and biological sensors.

The disclosed system and method can be used to predict and/or detect signatures of IEDs, e.g. explosives, electronics, initiators, tactics, etc., and provide actionable information to operational forces to neutralize the devices and terrorists cells using the devices. The disclosed system and method can provide real-time intelligence and identification of anomalous behavior for the prediction of IED intent as well as detection of the devices from a safe distance.

In other embodiments, the disclosed system and method can be used to improve traffic management and for forecasting future vehicle traffic flow conditions. Data can be collected from traditional road sensors, e.g. inductive loops, pneumatic road tubes, piezoelectric sensors and magnetic loops, as well as manual counts. Vehicle and traffic information can be collected from variety of sensors, for example, infrared, magnetic, microwave radar and ultrasonic sensors, acoustic devices, video image detection devices, mobile phones and global positioning system (GPS) devices. Traffic data can be indicative of, for example, volume count, speed, weight, vehicle classification, occupancy, presence, location, direction of travel.

The disclosed system and method can be used to generate traffic forecasts, reports and analysis useful for safety evaluation, pavement design, funding decisions and such. The disclosed system and method can provide, for example, calculations of infrastructure capacity, estimations of financial and social viability of projects and calculations of environmental impacts.

In further embodiments, the disclosed system and method can be used to predict and prevent financial services fraud in real-time by identifying anomalous activity. Data can be collected from, for example, credit card and banking transactions, mobile devices, social media, point of sale transactions, customer databases and external sources from data vendors.

In further embodiments, the disclosed system and method are broadly applicable to most any of the nation's critical infrastructure systems. For example, the U.S. Department of Homeland Security has identified at least sixteen critical infrastructure sectors including energy, transportation, communications, and financial services, as well as water and wastewater systems, chemical, critical manufacturing, food and agricultural, health care and public health, emergency services, nuclear reactors and materials. In still further embodiments, the disclosed system and method are applicable to various interdependent combinations of these critical infrastructure sectors.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 5A is a graph illustrating example test data in accordance with an embodiment of the disclosure.

FIG. 5B is a graph illustrating example test data in accordance with an embodiment of the disclosure.

DETAILED DESCRIPTION

Figure 1:
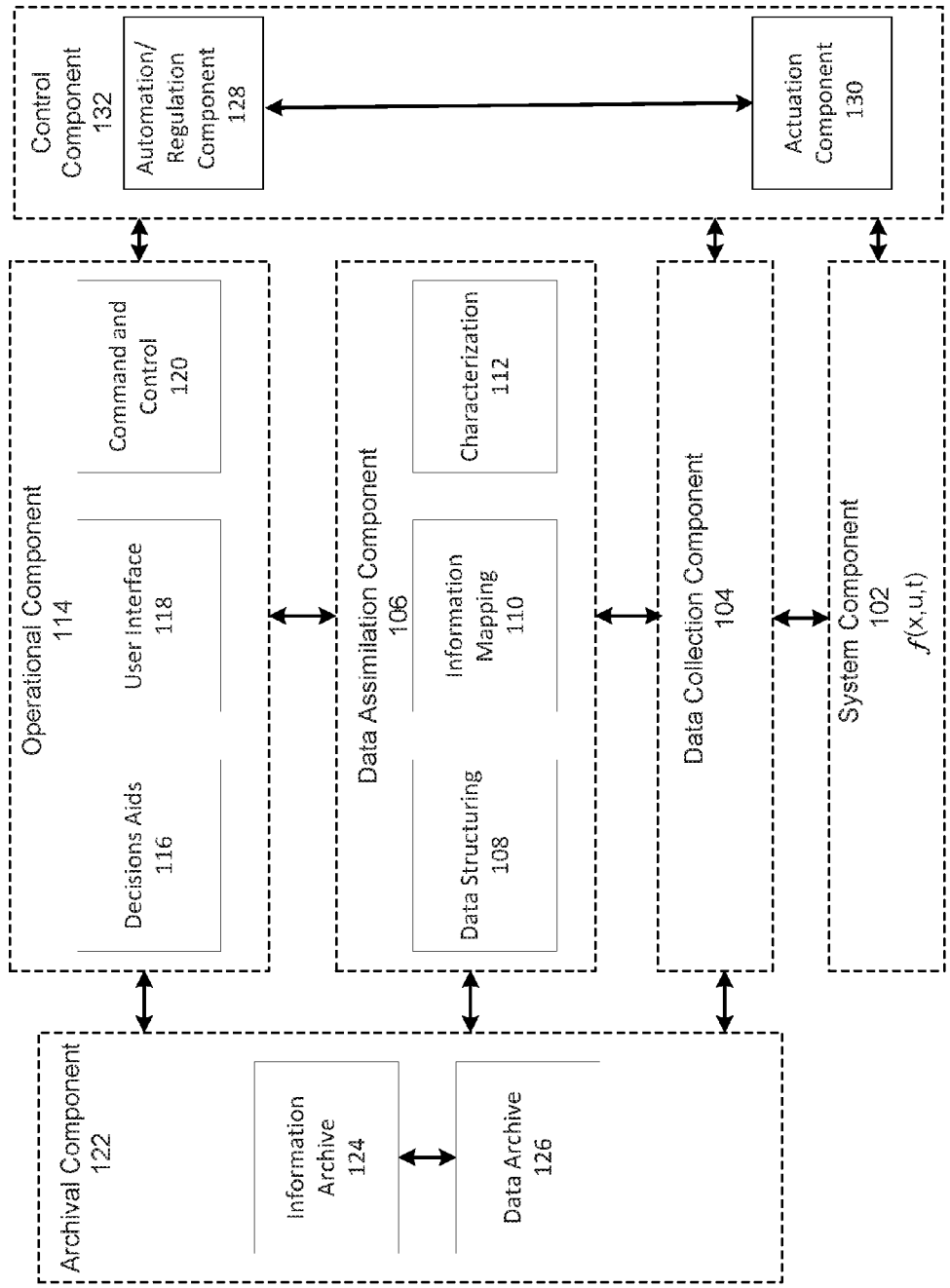
FIG. 1 illustrates an example information theoretic framework applied to a system in accordance with an embodiment of the disclosure.

The disclosure is now described with reference to the drawing, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Physical processes can be viewed as information processors. A significant extension to thermodynamic formalism is made by introducing generalized information theory, algorithmic information theory and complexity theory. The machinery of the thermodynamic formalism can be augmented by probabilistic models of computation (e.g., Non-deterministic Finite State Automata) and probabilistic computational methods (e.g., statistical machine learning) that may be used to capture both system dynamics and the stochastic nature of endogenous dynamics and exogenous disturbances in terms of summary variables that describe relevant behaviors at the spatiotemporal scales necessary for real-time monitoring, decision-making, and operational control tasks. The information-theoretic basis and its extensions, Generalized Information Theory for fuzzy measure theoretic models of uncertainty and algorithmic information theory (including complexity theory), provide a computational framework for integrating data across diverse time-scales, domains (i.e., physical (continuous and discrete) and cyber (computational and transactional)) delivering a unique view into the dynamic behavior of cyber-physical systems. The incorporation of probabilistic computational methods provides computational machinery that both scales to the size needed for large-scale systems and provides a rigorous alternative to assumptions of the thermodynamic limit.

The information-centric framework of the disclosure focuses on "information", or the amount of surprise obtained from a new observation or measurement. Observations that tell you what you already know are not informative. Conversely, those that surprise you, or tell you something new are informative. For example, a "u" following a "q" is not surprising, and it can be said that the "u" contains no information. While not definite, an "h" following a "t" is not a complete surprise and we say that the "h" does not contain full information. A "g" following a "q" would be very surprising, and thus it can be said that the "g" contains full information.

The purpose is to transmit information rather than data, that is, to transmit data which is informative.

The basic measure of information is Shannon entropy which may quantify the unpredictability of a random variable-average number of bits required to describe a random variable X:

$$H(x) = -\sum_{x \in X} p(x)\log_2(p(x))$$

Extensions of entropy characterize relationships between multiple variables and distributions. Further extensions such as Hartley Entropy for possibility measures (contra Shannon Entropy for probability measures) permit the measurement of information under more general notions of uncertainty (i.e. fuzzy measure theory). Joint entropy is a measure of the uncertainty associated with a set of variables. Conditional entropy quantifies the amount of information needed to describe the outcome of a random variable Y given that the value of another random variable X is known. Relative entropy is a non-symmetric measure of the difference between two probability distributions. The mutual information of two random variables is a quantity that measures the mutual dependence of the two random variables.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, within the context of cyber-physical systems, the terms "component" and "system" may refer to processes or equipment pertaining to the "physical" system that is interacting with the "cyber" system. For example, a component or subsystem may refer to a power line, recloser, or phase measurement unit in a power system.

As used herein, the term to "infer" or "inference" refer generally to the process of reasoning (e.g., inductive reasoning, abductive reasoning) about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

With reference to FIG. 1, in an example complex cyber-physical system the sensing, communication, and control infrastructures as well as the system being monitored and/or controlled are viewed as a single communication system where disparate elements of the system can be interpreted as a collection of "information processors" or communication channels communicating with one another. Communication between system elements can occur through both classic communication channels and through physical phenomena, as well as through mediating physics of the environment. The intrinsic communication topology thus described does not necessarily reflect the physical or logical organization of system elements.

In accordance with an embodiment of the disclosure, many system states can be observed indirectly through the measurement of physical phenomena related to the state of the system and the mediating dynamics of the environment and/or sensors may possess their own dynamics. There may be mediating dynamics of the system itself if the phenomena cannot be directly sensed. Also, it may be the case that the dynamics of interest are observed via the measured dynamics of another system connected to the first. This is the basis of the eponymous Luenberger Observer and by extension, the Kalman Filter.

However, generally only the extended system $f'(x',u',t)$ may be observed directly, and control inputs are subject to their own distortions, directly affecting observation. Within the context of information theory, these systematic challenges are considered as a process of information encoding.

Physical mediation, measurement and communication processes, and operational logic can be considered as communication channels that may have their own nondeterministic dynamics. Still referring to FIG. 1, System component 102 encodes information of interest in terms of the states of the system and their distorted reflection observable via the available observation processes. System component 102 is the system under observation. In general, it is not possible to obtain pure, perfectly accurate, infinitely precise observations from a system. The system under observation itself, environmental effects, changes wrought by the addition of sensors (added mass for instance), the limitations of sensors (e.g., cross talk), their conversion from analog to digital, etc. implicitly encode the information obtained from the system under observation. Also, the measurements available are generally connected to observable phenomena not to the desired information. The hope (in most cases) is that the observed phenomena reflect, i.e. are an encoded form of, the desired information. All that observations can provide are an encoded version of the desired information at best. Encoding of system information is unavoidable and it is likely that an encoding of part of the information that is also corrupted by other effects is obtained.

Data collection component 104 can include sensors and their associated signal conditioning systems, communications equipment (TCP/IP-based networks including both wired and wireless networking equipment such as UTP, routers, and switches, CAN bus, SCADA networks), computer interface hardware such as A/D boards or data acquisition systems, interface software such as Labview, intermediate storage, and servers. In aspects, data collection component 104 can include sensors, for example, image sensors such as stereo cameras, depth cameras, charge-coupled devices, complementary metal oxide semiconductor active pixel sensors, infrared and/or thermal sensors, sensors associated with an image intensifier and others sensors.

The data assimilation component 106 can provide information decoding and can include, for example, data structuring component 108, information mapping component 110 and characterization component 112. Data assimilation component 106 can provide a decoding function including the extraction of useful information from the data gathered at data collection component 104. The assimilation layer can be thought of as providing a decoding for manipulation/analysis in an abstract space.

The data assimilation component 106 can provide the functionality associated with most any of the steps described below in connection with FIGS. 2 and 3 including, but not limited to, Data Structuring 204, Symbolic Encoding 218, ϵ-Machine Reconstruction 220, Model Analysis 222, Thermodynamic Variable Construction 312, Thermodynamic Model Construction 304 and Thermodynamic Analysis 308.

Data structuring component 108 is concerned with eliciting the basic organization of data. Manifold learning, a principal tool of dimension reduction, can be used to discover a low dimensional manifold in a higher dimensional space that data are constrained to lie on and this identify the essential structure of the data. Diffusion mapping is a particular technique for manifold learning that can be used for accomplishing this structuring. In an embodiment, pairwise analysis of mutual informations, for instance, can also be used to identify the data structure. Data structuring concerns the information content, i.e., the amount of surprise. Data Structuring component 108 includes manifold learning and can perform, for example, correlation of data, and, in conjunction with information measures, identification of mutual information.

Information measures can be used in manifold learning, for example, Shannon entropy is a measure of the amount of surprise. Shannon information has useful properties for a basis of an intrinsic communications topology, e.g. branching, sensitivity to nonlinear connections etc., lacking in other measures and can provide a basis for manifold learning. Classical (i.e. Shannon) information theory concerns itself with the "surprise" content of data and provides its fundamental measure, Shannon entropy. Information theory also provides the fundamental laws that information obeys and thus provides a mathematical structure for information analysis.

Algorithmic information theory provides similar metrics and structure to examine the "value" of information, e.g., Kolmogorov-Chaitin Complexity, as well as the costs associated with extracting and using the information. The value of information can be related to a particular goal or objective and thus this complexity measure is useful for identifying different types of information that map to different objectives (i.e. information that has evidentiary value for a particular application.

Information mapping component 110 concerns the "value" of information and can provide, for example, data selection, data fusion, data partitioning, clustering, feature discovery, and can include a priori knowledge. The value of a bit of information is directly proportional to the minimum description length of some object of interest. For example, if one is interested in the health of some component and 5 bits of information are the smallest quantity of information that will suffice for determining the component's health, the (relative) value of each bit of information is ⅕. If the value of the objective is known, the absolute value of each bit may be determined. For instance, if knowing that a component will fail in 2 hours is worth $500, the value of each bit of information is $100. In other words, the value of information can be directly connected to a particular goal or objective, the purpose of the mapping is to map bits of information to the various objectives/goals. Intrinsic to this mapping is the compaction of available information to the minimal portion needed for each particular objective/goal.

Feature discovery can be seen as a search for a compact set of descriptors, or summary variables, that efficiently encode relevant information. Information extraction, coding, constructing/discovering embedding manifolds for dimension reduction, constructing sparse representations for compressive sensing, sampling, and the like can be processes of identifying or metrizing features of a system. The central challenge underlying these application specific challenges can be stated in a general, abstract form as the problem of determining the true, typically low dimension, manifold on which the data points are constrained to lie.

Characterization component 112 concerns the "cost" of information and can perform, for example, the functions of model selection, statistical inference, feature extraction, representation hierarchy and measures. The costs associated with extracting and using information, e.g., memory required, number of operations required, accuracy, precision, can serve as a useful metric for determining the computational costs associated with a particular method for explicitly mapping information to a particular goal or objective. The various costs associated with extracting and using the information provide a trade space in which different approaches may be examined. For example, an approximate solution may provide sufficient accuracy and precision while requiring significantly less memory or operations than an exact solution.

Still referring to FIG. 1, Operational component 114 provides an encoding function and can include decision aids 116, a user interface 118 and command and control component 120. The Operational component 114 can provide an encoding of the products of the manipulation/analysis in the abstract space into a form amenable to assimilation and interpretation by human operators. In an embodiment, Operational component 114 can provide an output indicating a baseline system behavior and/or an anomalous system behavior.

User Interface 118 can allow the user to interact with the system by sending information to the other components of system or by presenting information to the user about the system. User Interface 118 can be used, for example, to issue direct commands to the system and/or to obtain feedback from the system. In an embodiment, User Interface 118 sends information to Automation/Regulation component 128 which in turn can interact with System component 102.

User interface 118 can include, for example, summary variables, metrics, alarms, alarm management, user representation and human factors.

Decision aids 116 include, for example, information manipulation, probing, sensitivity analysis, optimization, diagnosis and prognosis. Command and control component 120 includes operator commands, control law selection and tuning, policy objectives and scripting.

Archival component 122 can function both as a storage system and a mechanism that can be used to locate and retrieve information for the system. Archival component 122 can include an information archive 124 and data archive 126. Information archive 124 comprises, for example, system measures, metrics, features, patterns and symmetry. Data archive 126 can include, for example, raw data, time series data structures and metatagging.

Control component 132 can include Automation/Regulation component 128 and Actuation component 130 which are viewed as communication channels from Operational Component 114 to System component 102. Actuation component 130 can be configured to provide control of the system under observation. Actuation component 130 can include, for example in the context of a power grid cyber physical system, protection relays, intelligent switches, reclosers, and sectionalizers. In aspects, service between a fault and the substations that serve a feeder can be restored by automatically manipulating the feeders' reclosers and switches. In an embodiment, Actuation component 130 can be utilized to contain a power outage to the area between an accident site and the nearest recloser in the direction of each substation, and repair crews can be automatically dispatched to clear the fault and make repairs.

Automation component 128 contains the logic directing the behaviors of the elements of the Actuation component 130 and may be embodied in software, hard-wired circuitry, programmable logic controllers (PLC), and similar.

A principal role of cyber elements of many CPS is to effect control, optimization, or management of a base system (e.g. power grid). The Automation/Regulation component 128 and Actuation component 130 can be used to supply "probing" inputs to the base system. Automation/Regulation component 128 can supply the logic behind the probing while Actuation component 130 supplies the cyber-physical application of the probing input. Identifying dynamics from available observations assumes that the dynamics are active. The role of probing inputs is to ensure that the dynamics of interest are excited so that, given an appropriate observation process, they may be captured via the collected information, e.g. system component 102.

Figure 2:
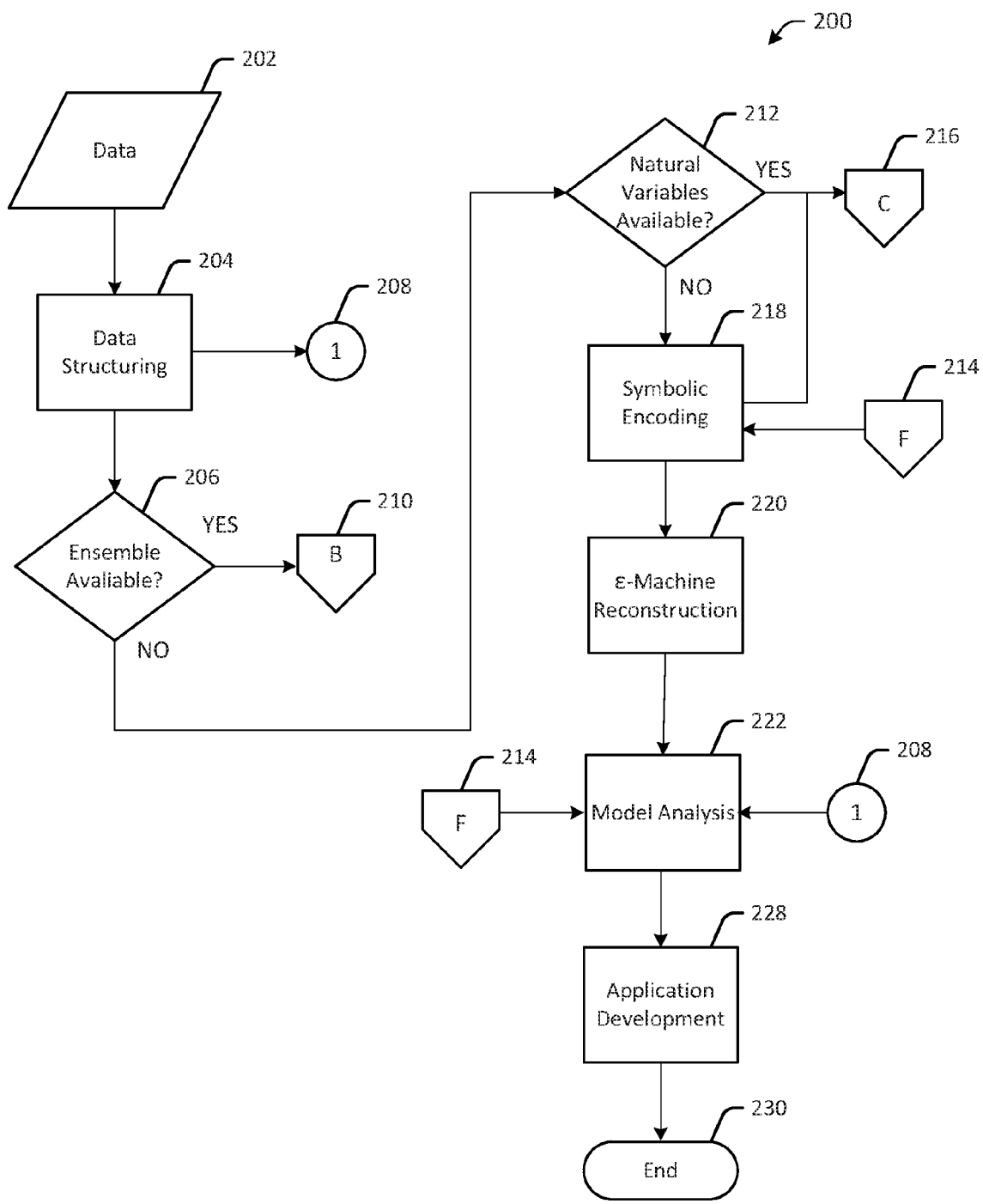
FIG. 2 is a flow chart diagram in accordance with an embodiment of the disclosure.
Figure 3:
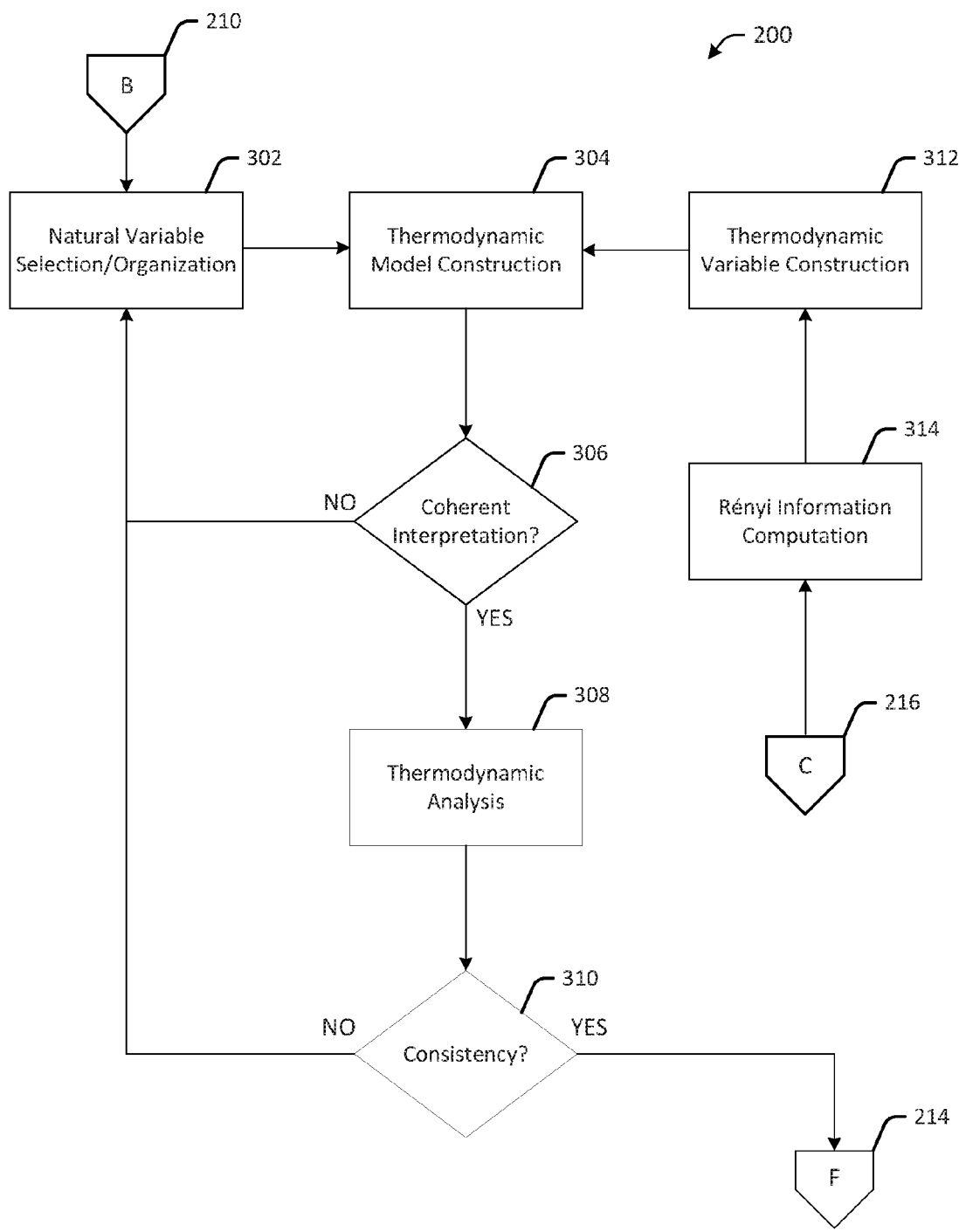
FIG. 3 is a flow chart diagram in accordance with an embodiment of the disclosure.

FIG. 2 illustrates a computer implemented method 200 that utilizes probabilistic grammatical inference and statistical data analysis techniques to characterize the behavior of systems in terms of a low dimensional set of summary variables and, on the basis of the models, classifies known or baseline system behaviors, as well as abnormal or anomalous system behaviors, in accordance with aspects of the disclosure.

In addition to recognizing an anomalous condition, classification can recognize system behaviors pertaining to specific conditions (e.g., operating condition, equipment health, environmental effects, etc.) that may have previously been observed and thus can be used to classify which condition exists. Classification can be used to identify operational and health and condition classes that are useful for planning, detection of specific faults, prediction and prognosis of faults, isolating faults, reconfiguring automation and control to accommodate changing operational or health conditions and such. Classification of system behaviors can be useful for system monitoring.

While, for purposes of simplicity of explanation, the one or more methodologies shown herein, e.g., in the form of a flow chart, are shown and described as a series of acts, it is to be understood and appreciated that the disclosure is not limited by the order of acts, as one or more acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. One or more acts described in connection with an embodiment may be combined with acts described in connection with other embodiments. Moreover, not all illustrated acts may be required to implement a methodology in accordance with the disclosure.

As shown in FIG. 2, an example framework includes complementary approaches for constructing models of cyber networks and/or cyber-physical systems. The stages can include: 1) identify the information topology associated with the system dynamics via diffusion mapping techniques or similar spectral graph analysis methods, 2) partition the system model on the basis of the identified information topology and construct sets of summary variables corresponding to the partitioned subsystems via the appropriate modeling approach, 3) construct mesoscopic models of system/subsystem dynamics for the corresponding variable sets and modeling approach, and 4) perform further analysis on the resultant models.

Method 200 can begin at step 202 where data is collected. In an embodiment, heterogenous sensor data can be collected. In aspects, phasor measurement unit (PMU) data can be sampled from dispersed locations in a power system network and synchronized from a common time source, for example, a global positioning system (GPS) clock.

In an embodiment, data includes sensor data obtained from phasor measurement units (PMUs) which monitor an electrical power system and can be located at various locations on the electrical power grid. PMUs may monitor and record variables or characteristics, such as the grid frequency, voltage, current, and phase angles at high time resolution.

As used herein, the term "sensor" refers to most any component capable of measuring a phenomena or event of interest. In aspects, for example, a sensor may refer to a computational process whereby transactions of interest are recorded. In an embodiment, a sensor may refer to most any combination of hardware and/or software systems for capturing communications network transactions, for example, source and destination IP address pairs, flags, fragment offset, header checksum, packet size, port pairs, packet headers, encryption, protocol type, deep packet analysis or packet content.

In other aspects, sensor data can include data associated with, for example, image sensors such as stereo cameras, depth cameras, charge-coupled devices, complementary metal oxide semiconductor active pixel sensors, infrared and/or thermal sensors, sensors associated with an image intensifier, and most any other sensor.

Data collected at step 202 proceeds to Data Structuring 204. Data Structuring can be utilized to identify the implicit structure of a system by discovering the structure of the data associated with the system. That is, the structure of the data will reflect the structure of the system. Data Structuring 204 can be used to discover the intrinsic structure including coherency between observations of the system separated temporally and/or spatially and at different spatiotemporal scales.

In accordance with an embodiment of the disclosure, the system and method utilize a manifold learning technique wherein the lower order manifold on which the system's dynamics are constrained to evolve (within a much higher dimensional space) are discovered through inferential and differential geometric processes. In aspects, a kernalized spectral graph-theoretic method, known as diffusion maps, can be used to discover the structure of this manifold. The specific kernel used is not necessarily known a priori but can be determined via empirical testing. The most commonly used kernel, however, is the diffusion kernel (or heat kernel) that describes diffusion processes in continuous media (e.g., heat diffusion in a plate). It is noteworthy that this has a well-known connection to statistical thermodynamics and thus to information. Furthermore, the "diffusion distance" used for this implementation are information measures such as Kulback-Leibler divergence. The extension to entropic measures for fuzzy measures afforded by Generalized Information Theory permits retention of fuzzy measure-theoretic bases for models and relations The spectral graph theoretic treatment can provide an informative basis for inference about a complex system and about its substructures. Connection matrices and graph Laplacians quantify the system wide influence of the system objects, and Laplacian eigenvalues quantify the system significance of the association between interacting system objects relative to most all associations in the network and provides the basis for identifying system invariants and, via modal truncation approaches, constructing lower order manifolds upon which the observations are dense. These objects can be used, in conjunction with different post processing methods, for the discovery of coherent groups, classification, time series analysis and pathway analysis.

This mechanism for discovering densely populated submanifolds provides the wherewithal to construct a metrization for transactional data that does not possess an inherent notion of nearness (and is thus ill-suited for statistical inference techniques which rely on notions of distance between observations. By constructing an arbitrary bijective (one-to-one and onto) mapping (necessary for uniqueness) from the transaction space to a metric space, a useful metrization of transactional data may be obtained by identifying the appropriate submanifold within this arbitrary metric space via the Diffusion Map Technique. Thus, the Diffusion Map Technique provides a useful representation and analyses of cyber-physical systems with transactional dynamics, that do not possess an intrinsic notion of nearness required by Bayesian and classical statistical inference approaches or other data driven or graph theoretic approaches.

A significant problem in cyber networks and large-scale CPS systems is related to operational security and reliability. In this context, various operating modes (normal, alert, emergency, in extremes, and restorative) have been identified. Using pattern discovery approaches to assess the transitional dynamics from normal to alert to emergency provides a significant advancement to Intrusion Detection Systems, for example in the cyber network context, situational awareness and to improving system operation. Output 1 208 of Data Structuring 204 is a minimal representation of the system in the form of microvariables and can be provided as an input to Ensemble Available step 206 and the Model Analysis step 222 (discussed infra).

The method 200 continues to an Ensemble Available 206 check. An ensemble may be identified based on the microvariables and intrinsic properties associated with the system and obtained as an output of Data Structuring 204. In aspects, microvariables associated with a system can be analogized to thermodynamic microstates, for example, position and momentum of an atom. If an appropriate ensemble (probability distribution) is not available via the intrinsic properties of the system (e.g., Grand Cannonical Ensemble for open thermodynamic systems, Halting Probability for computer programs), it may be determined empirically. The techniques of symbolic dynamics provides a mechanism wherein the system dynamics of cyber networks and cyber-physical systems, continuous, discrete, and transactional, can be lifted to a discrete covering space from which appropriate ensembles can be estimated. System trajectories can be described by a string of symbols and system dynamics can be described by the shift dynamics of the string.

Established techniques in statistical mechanics can be used to construct the ensemble (distribution) once microvariables are available. Natural variables may identified through inspection of the system and can be used if available. If natural variables are not available, feature discovery techniques are used to identify variables and techniques for construction of ensembles are brought to bear.

Natural variables may exist for some systems (temperature, pressure, concentration for thermodynamic systems) and may be discoverable using first principles approaches. If natural variables are not readily available, then the feature identification machinery is brought into play to determine appropriate variables. Once the variables are determined, the associated ensembles can be determined empirically.

If an ensemble is available 206 YES, the method proceeds to Natural Variable Selection and Organization 302, via connector B 210.

The thermodynamic formalism utilizes two key facets of this theory to provide analysis and synthesis tools for a broader class of problems; 1) thermodynamic techniques can be formulated such that they are not restricted to physical thermodynamics but can be applicable to general statistics such as algorithm measures with a generalization of Chaitin's halting probability, and 2) the traditional thermodynamic analysis can be inverted so that thermodynamic quantities (e.g., temperature, pressure, free energy) can be deduced from observed distributions. The combination of these two aspects can provide a rigorous basis for the elicitation of natural variables, or summary variables, for large-scale complex systems that possess clear analogs in physical systems.

The method 200 proceeds from Natural Variable Selection and Organization 302 to Thermodynamic Model Construction 304. Natural variables, identified through inspection or identified via feature discovery, are used to construct the ensemble from which, via Gibbs fundamental equations, thermodynamic models can be directly constructed. The Natural Variables identified at step 302 and/or the Thermodynamic Variables identified at step 312 serve as inputs to Thermodynamic Model Construction step 304.

The Thermodynamic Model Construction step 304 is based on the thermodynamic formalism. As discussed above, the thermodynamic formalism utilizes two aspects to provide analysis and synthesis tools for a broader class of problems; 1) thermodynamic techniques can be formulated to apply to general statistics, and 2) traditional thermodynamic analysis can be inverted so that thermodynamic quantities can be deduced from observed distributions.

The thermodynamic formalism has its roots in traditional thermodynamics. In thermodynamics of physical systems, a probability distribution, known as the canonical ensemble, of microstates that describe the system's thermodynamic equilibrium state is sought on the basis of incomplete information, specifically, knowledge of only the system's mean temperature. If additional information such as pressure or chemical potential is available, more detailed distributions, known as generalized canonical ensemble, are sought.

The first of the above facets concerns the fact that, stated in terms of abstract variables instead of the usual thermodynamic variables, the probability distributions, known as Gibbs distributions, do not privilege any particular type of variable. That is, the Gibbs distribution $P_i = 2^{(\Psi - \beta_\sigma M_i^\sigma)}$ holds for most any appropriately selected ensemble of microstates $i=1, 2, \ldots, n$ and known mean values $M_i^\sigma$ for several random quantities $M_i^\sigma$. These random quantities are typically extensities, thermodynamic variables related to a systems extent such as energy. The remaining variables are merely Lagrange multipliers with $\Psi$ known as a generalized free energy and the coefficients $\beta_\sigma$ called intensities. Thus if an appropriate ensemble, such as the ensemble of programs that halt, can be found, the fundamental thermodynamic relations will hold for most any set of appropriately chosen random quantities and the system's state may be specified in terms of summary variables consisting of the set of extensities or intensities or a combination.

Particular sets of thermodynamic variables can be connected to each of the free energies via Legendre transformations. Moreover, the free energies are thermodynamic potentials in that they behave as ordinary mechanical functions. This means that, if the variables $M_i^\sigma$ and T, called natural variables of $\Psi$, are chosen as independent variables, we obtain:

$$\frac{\partial \Psi}{\partial M^\sigma} = \beta'_\sigma, \frac{\partial \Psi}{\partial T} = -H$$

In a manner analogous to the relationship between forces and mechanical potentials, a set of thermodynamic variables can be obtained by forming derivatives of $\Psi$ with respect to the natural variables. This is exploited in the second of the above facets. A thermodynamic potential can be computed in the form of Rényi Information $$I_\beta(p) = \frac{1}{\beta - 1} \log_2 \sum_{i=1}^{n} (p_i)^\beta,$$

from an estimated distribution obtained from observations from extant CPS or from numerical experiments on models of CPS can be used to compute thermodynamic potentials and summary variables via equation. These potentials and variables obey the fundamental thermodynamic relations. This approach can be particularly valuable in cases where an appropriate ensemble cannot be identified a priori.

Returning to the alternate case for Ensemble Available step 206 NO, when no ensemble is available, that is, the Gibbs distribution noted above does not hold for the selected ensemble, method 200 proceeds to step 212 where a decision is made concerning the availability of natural variables. If Natural Variables 212 are available, the method 200 proceeds, via connector C 216, to Rényi Information Computation 314 as shown in FIG. 3. Rényi entropies (informations) can be shown to possess the requisite structure of a thermodynamic potential and thus furnish the analyst with the basis of a thermodynamic model.

Differentiating Rényi Information of order $\beta$ with respect to $\beta$ produces $$\frac{dI_\beta}{d\beta} = \frac{1}{(1-\beta)^2} \sum_{i=1}^{n} p_i \log_2 \frac{P_i}{p_i}$$

where the probabilities $$P_i = \frac{p_i^\beta}{\sum_{j=1}^{n} p_j^\beta}$$

are known as escort distributions. It can be shown that an escort distribution is formally a Helmholtz distribution (up to a factor $\mu^{-1}$). Rewriting the escort distribution as $$P_i = 2^{(\Psi - \beta b_i)}$$

where $b_i = -\log_2 p_i$ is the bit number associated with $p_i$. The normalization $$\sum_{i=1}^{n} P_i = 1$$

yields $$\Psi = -\log_2 Z$$

where Z is the so-called partition function $$Z = \sum_{i=1}^{n} 2^{-\beta_\sigma M_i^\sigma}$$

where $M_i^o$ are the mean values of measured variables. Rewriting the escort distribution in terms of the system's mean energy E produces the canonical ensemble $$P_i = 2^{\beta(F-E)}$$

where F is the Helmholtz Free Energy $$F(\beta) = \frac{1}{\beta} \log_2 Z(\beta) = \frac{1}{\beta} \Psi(\beta).$$

This is directly connected with the Rényi Information of order $\beta$ of the original distribution:

$$I_\beta(p) = \frac{1}{\beta - 1} \log_2 \sum_{i=1}^{n} p_i^\beta = -\frac{1}{\beta - 1} \Psi(\beta).$$

Thus, the Rényi Informations of order $\beta$ collectively provide a thermodynamic potential and hence a basis for the construction of thermodynamic models. Further, as the Rényi Informations of order $\beta$ may be directly calculated from empirical distributions, the thermodynamic variables and thermodynamic relationships can provide an immediate model of equilibrium behavior.

The method 200 proceeds from Rényi Information Computation step 314 to Thermodynamic Variable Construction step 312. A challenge in applying the thermodynamic formalism described above, e.g. in connection with Thermodynamic Model Construction 304, is identifying the appropriate variables for use in the construction of the Rényi Informations of order $\beta$. While an empirical distribution can be constructed for most any observable, identifying those which adequately characterize the system is often a less than straight-forward task. Further, those variables whose mean values $M_i^o$ characterize the constraints on the system can be even more challenging. For example, in a large scale power system, identifying a particular system variable (voltage, current, phase angle, or collection thereof) is not straight-forward. For simpler systems, a brute force approach treating all variable may be viable but for large scale complex systems the number of variables may be, for all intents and purposes, innumerable and impossible to observe directly.

In these instances, a low dimensional model is useful. Further, an approach specifically designed to find the corresponding summary variables associated with the evolution of a low dimensional model is well suited for use with the thermodynamic formalism. To this end, the Diffusion Map Technique may be applied.

The underlying notion for Diffusion Map Technique and its kindred dimension reduction techniques is that, while the space a system lives in may possess a high number of dimensions, the implicit constraints enforced by the system dynamics ensures that not all points of this space will be visited by this system and in fact the system trajectory within this high dimensional space actually lie on a much lower dimensional manifold within the larger space. Finding this manifold and the appropriate system representation on that manifold can produce a much lower dimensional model. The discovery of these manifolds is known as manifold learning.

The variables that describe the system on these low order manifolds are abstract objects but may be interpreted as summary variables and used for thermodynamic analysis. As an exemplar approach, the Diffusion Mapping Technique is a kernalized spectral graph method that relies on the connection between the Laplace-Beltrami operator and the random walk graph Laplacian. Simply put, under this connection, a random walk on a graph can be treated as a continuous diffusion process on a manifold and thus differential geometric methods may be used to construct this manifold.

In particular, heat kernels that describe local diffusion processes as diffusion in the plane can be used to construct the appropriate diffusion process in a (differentially) piecewise fashion. Specifically, the first few Laplacian eigenvalues/eigenvectors of a graph are a discrete approximation of the Laplace-Beltrami operator and thus capture the local structure of the manifold. A model truncation approach thus provides a reduced order model where the eigenvector provide the local coordinate axes and the associated eigenvalues the coordinates. These modal coordinates provide the desired summary variables and the modal coordinate axes can be interpreted as analogous to energy shells in statistical thermodynamics.

The method 200 proceeds from Thermodynamic Variable Construction 312 to Thermodynamic Model Construction 304. The Natural Variables identified at step 302 and the Thermodynamic Variables identified at step 312 serve as inputs to Thermodynamic Model Construction step 304. At step 306 a Coherent Interpretation check is done. For example, an analysis of whether or not the particular set of thermodynamic variables chosen offers a coherent interpretation as analogs to more commonly known thermodynamic variables (temperature, pressure), and thus provide a useful summary to operators/analysts. If not, another set of variables can be examined as the selection of variables can be a free choice under this paradigm.

Turning to Thermodynamic Analysis 308, the change from small systems to large systems is described by the thermodynamic limit wherein the number of components and system extent become extremely large while densities and intensities remain constant. In the thermodynamic limit, the relations between the macroscopic thermal variables coincide for the different ensembles. This means that the different ensembles are directly comparable and the connection between the free energies associated with the various ensembles can be formulated;

$$G=F+\Pi V=\Omega+\mu N.$$

Considering the information gain (i.e. KL divergence) from a generalized canonical distribution P, i.e. Gibbs distribution to neighboring distribution $P+\delta P$, which is obtained by a variation $\delta\beta_\sigma$ of the intensities $\beta_\sigma$:

$$D(P+\delta P\|P) = \sum_i (P+\delta P)[\log_2(P+\delta P) - \log_2 P_i]$$

$$= -\delta S - \sum_i \delta P_i \log_2 P_i$$

$$= -\delta S + \beta_\sigma \delta M^\sigma \geq 0.$$

If the variations of $\delta P_i$ are infinitesimally small then the inequality $$\left(\frac{\partial S}{\partial M^\sigma} - \beta_\sigma\right)\delta M^\sigma + \frac{1}{2}\frac{\partial^2 S}{\partial M^\sigma \partial M^\tau}\delta M^\sigma \delta M^\tau \leq 0,$$

is obtained. As the infinitesimal variations $\delta M$ are arbitrary and take on both signs, the inequality given above provides two important relations. The first is that the term linear in $\delta M$ must be identically 0, that is $$\frac{\partial S}{\partial M^\sigma} = \beta_\sigma.$$

Thus, the general relationship between the thermal variables can be formulated;

$$dS=\beta_\sigma dM^\sigma,$$

where $S=-I_S(p)$ is the Shannon entropy.

For the grand canonical ensemble, the general relationship between thermodynamic variables can take the form $$dE=TdS-\Pi dV+\mu dN$$

and is known as Gibb's fundamental equation. The quantities S, V, and N are extensive parameters and the quantities T, $\Pi$, and $\mu$ are intensive parameters. The equilibrium state of a system can be described alternatively by the complete set of extensities or by the complete set of intensities, or by a set of mixed variables. In this context, these variables are called thermal variables.

Particular sets of thermodynamic variables can be connected to each of the free energies via Legendre transformations. Applying the definition of Shannon entropy to the generalized canonical distribution yields $$S=-\Psi+\beta_\sigma M^\sigma.$$

For the canonical ensemble, the Shannon entropy takes the form $$S=\beta(E-F).$$

Thus, the Helmholtz free energy can be defined $$F=E-TS.$$

This corresponds to a Legendre transformation from E(S,V,N) to F(T,V,N) and therefore, using the definition of Helmholtz Free Energy above, Gibbs Fundamental Equation takes on the form $$dF=-\Pi dV+\mu dN-SdT.$$

This means that, if the variables V, N, and T are chosen as independent variables, we obtain $$\frac{\partial F}{\partial V} = -\pi,$$

$$\frac{\partial F}{\partial N} = \mu,$$

$$\frac{\partial F}{\partial T} = -S$$

The quantities V, N, and T are called the natural variables of F and they represent a complete set of thermal variables. By forming derivatives of F with respect to the natural variables, we obtain another complete set of thermal variables. The connection between F and its natural variables is similar to forces and potentials in a mechanical system, hence, F as a function of its natural variables is called a thermodynamic potential.

The disclosed method can proceed to other thermodynamic potentials via a Legendre transformation. For instance, Gibb's free energy is connected with F by a Legendre transformation from the variable V to the variable $\Pi$ and Gibbs fundamental equation takes the form $$dG=Vd\Pi+\mu dN-SdT.$$

Therefore, T, $\Pi$, and N are the natural variables of G and $$\frac{\partial G}{\partial \Pi} = V,$$

$$\frac{\partial G}{\partial N} = \mu,$$

$$\frac{\partial G}{\partial T} = -S.$$

The analogy between thermodynamic and mechanical potentials can extend beyond the similarity between the above relationship between natural variables and Gibbs free energy and the relationship between potentials and forces. Just as mechanical equilibria are determined by the minima of potentials, thermodynamic potentials also possess extrema. The different thermodynamic potential can be interpreted as different Legendre transformation of entropy. Note that this implies that entropy is itself a thermodynamic potential. Therefore, through the thermodynamic formalism, the available information can be exploited to develop "natural variables" and thermodynamic potentials that summarize the state of the system in a meaningful way and can be used to model an expected, or baseline, system behavior. Anomalous system behavior can be identified as a deviation from the system baseline behavior. The summary quantities come with a "built-in" interpretation that simplifies the job of system operators and analysts and provides an intrinsic structure for correlating observed behaviors for improved event detection, situational awareness, fusion, and alarm management.

Consistency step 310 is a straight-forward check as to whether the thermodynamic relations described above are satisfied by the set of variables obtained. Connector F 214 can be an output of the Thermodynamic Analysis 308 and Consistency 310. The output of the Thermodynamic Analysis 308 and Consistency 310 can be provided as an input to Symbolic Encoding 218 and the Model Analysis step 222.

When natural variables 212 NO are not available via inspection or simple brute force search methods, the method 200 proceeds to Symbolic Encoding 218. The process for determining a useful symbolic encoding 218 can be decomposed into two parts; first the determination of an appropriate embedding followed by construction of a partition of the embedding.

The processes for refining the embedding of interest and for determining a generating partition of this embedding can be performed using the known methods of False Nearest Neighbors and Symbolic False Nearest Neighbors, respectively. However, because these traditional methods require the enumeration of all neighbor distances, they suffer from polynomial growth in time complexity with increasing numbers of points. The disclosed system and method provides an alternative that improves efficiency as the clustering approaches provide a less computationally expensive alternative.

When an Ensemble is Available 206 (YES) and Natural Variables 212 (YES) are available, the analysis is complete. If an Ensemble is Available 206 (YES) but Natural Variables 212 (NO) are not, then summary variables can be identified by forming derivatives with respect to the natural variables, as discussed above. When no Ensemble is Available 206 (NO) and Natural Variables 212 (YES) are available, appropriate ensembles can be computed utilizing Rényi Information and by forming derivatives. When neither of an appropriate Ensemble is Available 206 (NO) nor Natural Variables 212 (NO) are available, Symbolic Encoding 218, Rényi Information and derivatives can be utilized to provide inputs to $\epsilon$-Machine Reconstruction step 220.

Symbolic dynamics can be used to identify natural variables by applying techniques to the microvariables. Symbolic dynamics can also be applied to thermodynamic variables, preparatory to performing $\epsilon$-Machine Reconstruction step 220 (i.e. Connector F 214). When neither of these conditions obtain natural variables, the symbolic encoding provides entry into the thermodynamic formalism that leads to the computation of the Renyi informations and on to the construction of thermodynamic variables. In aspects, the thermodynamic models are not dependent on $\epsilon$-Machine Reconstruction. $\epsilon$-Machine Reconstruction is a technique used to develop models (using microvariables) in parallel to thermodynamic models or in addition to (using thermodynamic variables).

The method proceeds to step 220 $\epsilon$-Machine Reconstruction. The disclosed system and method include innovative $\epsilon$-Machine Reconstruction techniques including discovery of common subtrees of the string parse tree via 1) nonparametric Bayesian clustering methods including Dirichlet Process based and Beta Process-based methods, and 2) Diffusion map techniques.

A formal language can be associated with a discrete automaton that is able to accept all legal words of L when acting on a signal S. Formal languages can then be classified according to the size of memory utilized by the corresponding automata. The process for constructing minimally complex automata that yield a description of an observed signal S is known as $\epsilon$-Machine Reconstruction, where the "$\epsilon$" indicates the dependence of the model on the observation process. $\epsilon$-Machine Reconstruction 220 is a statistical machine learning technique for inferring automata models of input data streams can be. This technique bootstraps from the simplest possible machine, adding complexity as needed, to deduce the minimal machine that accepts the observed sequence of data.

$\epsilon$-Machine Reconstruction 220 can include probabilistic grammatical inference techniques which infer the grammar or rules that a string of symbols obeys. Different languages possess different characteristics which may be exploited to deduce their grammars. In particular, the properties of languages exploited can be those given by the pumping lemmas. In lieu of periodicity, the pumping lemmas guarantee the existence of cycles in strings exceeding some minimum length. This leads directly to inspecting substrings of increasing lengths for the existence of these cycles.

Legal symbol strings can be seen as a restriction to a subset of all possible strings much like system dynamics can be seen as a restriction of a system's states to a subset (manifold) of all possible points in its associated state space. This subset is a language and, thus, the modeling problem can be cast as inferring the rules of inclusion or grammar of this language. The symbolic encoding permits access to the machinery of information theory and formal language theory and linguistic inference techniques can be applied to deducing relevant models to provide an alternative to the empirical approach described above for cases in which neither an ensemble or a set of natural variables are available or to augment the thermodynamic relations with a dynamical model of system evolution.

The construction of automata involves the construction of histograms of substrings of the input string. The histograms can be represented as a tree $T=\{n,\alpha\}$ consisting of nodes $n=\{n_i\}$ and directed, labeled arcs $$\alpha = \{\alpha_{ij} : (n_i \xrightarrow{s} n_j),$$

$n_i$, $n_j \in n$, $s \in A\}$ connecting them in a hierarchical structure. An L-level subtree $T_n^L$ is a tree that starts at node n and contains all nodes that can be reached within L arcs. The tree, thus constructed, can be a prefix tree as every node n in the tree can be associated with the preceding sequence or D-cylinder $\omega_n$. The ensemble associated with the sequences is approximated by recording the relative frequency of each observed $\omega_n$.

Each level L of this tree represents the observed L-length symbol subsequences. Shannon entropy thus provides a metric on the relative frequencies of the leaf nodes. The average branching rate in the tree is equivalent to the growth rate of the number of new sequences of increasing length. As such, it is directly related to the growth rate of Shannon entropy as a periodic process will, at some point, cease to generate new cylinders and a random one will not. The growth rate of Shannon entropy can thus be determined.

If the entropy growth rate does not vanish, the reconstruction process continues to the next level in representations and constructs a finite state automaton. The Myhill-Nerode Theorem provides the existence of an equivalence relation $R_L$ that divides the set of all finite strings from a regular language into equivalence classes. Furthermore, the Myhill-Nerode Theorem states that the number of states in the smallest deterministic finite automaton that accepts L is equal to the number of equivalence classes in $R_L$. Therefore, if any two strings x and y drive the automaton to the same state, they are in the same equivalence class. Consequently, if a partition into equivalence classes can be constructed, automaton can be constructed that uses its state to keep track of the equivalence class associated with the current substring.

To construct a finite state automata representation, it is assumed that repeated subtree structures are instances of the same state and merged into an equivalence class that is in turn associated with a state of the automata. Once the equivalence classes have been identified, the associated state and transition probabilities can be extracted from the prefix tree and the associated subtrees in a straight-forward manner. These state transition probabilities form the basis of the state transition functions, usually presented in matrix form.

Identifying disjoint sets of subtrees can be viewed as a clustering problem. As the number of states is not known a priori, non-parametric Bayesian identification of equivalence classes may be used for partitioning the tree into equivalence classes. Dirichlet Process-based clustering may provide a suitable mechanism for the inference of an arbitrary number of equivalence classes. As the potential scale of cyber-physical systems such as the electric power transmission and distribution system is enormous, and the inference may be executed in a distributed fashion, information-sharing attributes of these techniques provides additional utility for fusing information across concurrent inference processes. A hierarchical Dirichlet Process approach may be used.

The concept of Shannon entropy may be extended to characterize the information storage of higher order machines and its rate of increase with increasing tree depth, a characterization of the representation's suitability can be constructed that is analogous to the use of source entropy to evaluate the suitability of a tree representation.

For a Finite State Automata, the source entropy is given by the finitary complexity: $C_u = \Sigma_{v \in V} p_v \log_2 p_v$, where the probabilities $p_v$ can be defined on the $\in$-machine's vertices $v \in V$. A recursive algorithm for the computation of the growth rate of finitary complexity provides the analogous convergence criterion for a finite state automata representation.

A Beta Process may be used in place of, or in addition to, a Dirichlet process to associate to each sampled clique a set of latent Bernoulli variables to provide "featural" descriptions of cliques (i.e., terminal substrings). The above process of clustering on cliques (subgraphs) of the graph that results from the above clustering operation may be repeated via Beta Processes (Hierarchical Beta Processes) as the Bar-Hillel and Ogden Lemmas supply Pumping Lemmas for Context Free grammars and the Myhill-Nerode theorem can then be used to deduce these grammars in conjunction with the Chomsky-Schützenberger theorem. Alternatively, diffusion map techniques can be used to effect the clustering.

The method 200 proceeds from ϵ-Machine reconstruction 220 to Model Analysis 222. In general, the Model Analysis step 222 is a process of mapping model behaviors to observed phenomena within a system. The Model Analysis step 222 can be domain specific and can include an analysis of the connection matrices for detection of invariant dynamics and the identification of anomalous system behavior.

The method 200 proceeds from Model Analysis 222 to Application Development 228. Application Development 228 is a process of mapping model behaviors to observed phenomena within a system. Application Development 228 can take the form of, for example, software development or the development of command and control systems that use the mappings developed in Model Analysis step 222. Application Development 228 can be the instantiation of those maps in an operationally useful manner.

In an embodiment, the Application Development step 228 need not be a fixed process as a substantial aspect can be domain specific. Application Development 228 can include analyses of the connection matrices which can be used for detection of invariant dynamics and the identification of anomalous system behavior utilizing, for example, behavior classification algorithms or anomaly detection algorithms. The method 200 concludes at act 230.

As the models can be constructed within a thermodynamics framework, model approach selection may be dependent upon, for example, the class that a system belongs to, where class membership may be based upon availability of components of a natural thermodynamic description.

Moreover, multiple model construction approaches may be applied and the techniques may be applied serially, or in parallel, to extract information on the model structure, to construct a more detailed model, and/or to combine multiple models. Thermodynamic models are appropriate for capturing equilibrium and quasi-equilibrium phenomenal and detecting phase transitions. Dynamical models are best handled via approaches such as the epsilon-machine reconstruction approach. The process of applying multiple modeling approaches is indicated in the fourth stage of the process and may be augmented by additional statistical analyses and or user inspection.

Diffusion maps provide a powerful framework for eliciting the multi-scale structure and geometry of graphs and subsets of $\mathbb{R}^n$. In particular, diffusion mapping has demonstrated great utility as a technique for dimension reduction that is robust to nonlinearity and as a basis for partitioning large, high-dimensional data sets. Moreover, an extension, vector diffusion maps, permits direct treatment of vector fields. The essential notion underlying diffusion maps is that spectral embedding and clustering methods that are commonly used for non-linear dimensionality reduction can be probabilistically interpreted as a diffusion process and that the ordinary Euclidean distances in the embedding space measure intrinsic diffusion metrics on the data. This is enormously valuable as tools from harmonic analysis such as Fourier and wavelet decompositions and spectral analysis of pseudo-differential operators have been tremendously successful in the continuous Euclidean setting for many applications including compression, de-noising, and density estimation.

As noted above, from an information-theoretic perspective, the principle objective of machine learning, inference, and estimation tasks is to extract "actionable" information from available data sources. The key notions being that information is fundamentally different than data and that the value of information is a function of its relevance to the problem at hand. This is intimately related if not identical to the need to reduce dimensionality in high dimensional feature space. While the motives may be different, extracting relevant information versus addressing the curse of dimensionality, the rationales underlying approaches to these problems, determining the portion of the data contains relevant information versus identifying the lower dimensional manifold on which the data lie, are essentially identical. That is, the problem of finding a lower dimensional manifold on which the data lie is inherently identical to finding an efficient coding that maximizes the information content of the data.

More generally, these problems can be seen as a search for features, a compact set of descriptors that efficiently encode relevant information. Thus the problems associated with information extraction, coding, constructing/discovering embedding manifolds for dimension reduction, constructing sparse representations for compressive sensing, sampling, and so on are processes of identifying features, albeit in slightly different contexts. The central problem underlying these application specific challenges can be stated in a general, abstract form as the problem of determining the true, typically low dimension, manifold on which the data points are constrained to lie.

By virtue of the centrality of this problem, techniques for manifold discovery are thus central to the representation of data and to their manipulation. For this reason, it has long been an active area of research. Recent work has had a particular focus on kernel methods as their local support supplies a locality preserving property and their inherent nonlinearity provides robustness superior to that of classical methods such as PCA. Manifold learning has also produced several other dimension reduction techniques including local linear embedding, Laplacian eigenmaps, Hessian eigenmaps, and local tangent space alignment based on minimization of quadratic distortion measures. These methods lead to the application of eigen functions of Laplace-type operators as minimizers and provide the basis for their extension in the diffusion map technique.

As noted above, the essence of the diffusion map technique is based upon a probabilistic interpretation of spectral clustering methods as diffusion processes. That is, spectral methods can be interpreted as eliciting the behavior of random walks on adjacency matrices capturing the similarity between data points. Thus diffusion maps accomplish dimension reduction by "reorganizing" data according to its intrinsic geometry.

Consider a collection of N normalized data points $\{x_n\}_{n=1}^N$ where each $x_n \in \mathbb{R}^P$. The adjacency matrix captures the "similarity" between the disparate points. For example, the similarity may described as a quantized correlation matrix, $C=\{c_{ij}\}$, between data points where $c_{ij}=1$ if $(x_i \cdot x_j)$ 0.95 and $c_{ij}=0$ otherwise. A more general notion of this similarity can be used to describe the connectivity of the data by measuring with a local similarity measure to create a time dependent diffusion process. Specifically, a more continuous kernel version of this correlation-based similarity can be defined using a Gaussian kernel of width $\epsilon$ as $L_{ij}=k(x_i,x_j)=\exp(-\mu\|x_i-x_j\|^2/2\epsilon)$. By virtue of this similarity measure's relationship to diffusion processes and its local support, it integrates local geometry to elucidate geometric structure at different scales. Measures of this type thus provides a more meaningful notion of similarity than the usual principal components as it produces a measure of the similarity between two points at a particular scale (or time) based upon the revealed geometry.

It follows from the above that the data points can be thought of as nodes on a graph with a weight function $k(x,y)$ that satisfies the following properties:

k is symmetric: $k(x,y)=k(y,x)$, k is positivity preserving: $\forall x,y \in X, k(x,y) \geq 0$ k positive semi-definite: for all real-valued bounded functions f defined on X, $$\int_X \int_X k(x,y)f(x)f(y)d\mu(x)d\mu(y) \geq 0$$

where $\mu$ is a probability measure on X.

The random walk normalized Laplacian is given by $M=D^{-1}L$ where D is a diagonal normalization matrix defined $D=\text{Diag}([D_1, D_2, \ldots D_N])$ where $D_i=\Sigma_{j=1}^N L_{ij}$. Spectral methods devolve from the associated eigenvalue problem $M\phi=\lambda\phi$ or $L\phi=\lambda D\phi$ where the first few eigenvectors of M are used for low dimensional representation of data or clustering coordinates.

As noted above, spectral methods have demonstrated great utility for performing nonlinear dimension reduction. Geometrically, suppose that there exists a manifold X upon which the data points are uniformly distributed. It has been shown that the first few eigenvalues first few eigenvectors of $M=D^{-1}L$, are a discrete approximation of the Laplace-Beltrami operator on the manifold and thus captures the local structure of the manifold.

The normalized Laplacian M can be viewed as a stochastic matrix representing a random walk on the graph:

$$p(x^{t+1}=x_j \mid x^t=x_i)=M_{ij}=\frac{k(x_i,x_j)}{\sum_{j=1}^N k(x_i,x_j)}. \quad (0.1)$$

Under this interpretation, the entries of M can be viewed as transition probabilities between the graph nodes associated with the data points. The connectivity between data points is the probability that random walk at one point will transition to another, i.e. the more similar or related two points are, the greater the transition probability between them and conversely. The Gaussian kernel used to construct L can thus be seen as a non-normalized likelihood function known as the diffusion kernel. Powers of the matrix M are equivalent to iterating the random walk where $M^r$ denotes the $r^{th}$ iteration of the walk and, equivalently, the entries of $\{m_{ij}^r\}$ are the probabilities of transitioning from $x_i$ to $x_j$ in r time steps:

$$p(t=r\epsilon, y \mid x_i) = p(x^t=y \mid x^0=x_i) = e_i M^r \quad (0.2)$$

where $e_i$ is a row vector with all zeroes except for a 1 in the $i^{th}$ position. Note also that the kernel width $\epsilon$ has a dual interpretation here as a time step, hence $t=r\epsilon$. As the probabilities $\{m_{ij}^r\}$ are calculated for increasing values of r, the structure of the data set is observed at different time scales. With increased values of r, i.e. running the diffusion process forward, the probability of following a path along the underlying geometric structure increases as the data points are densely connected along the structure. Short, high probability transitions will compose a more likely path then one with a few long, low-probability transitions.

Note that high probabilities are associated with nearness and low probabilities with large distances between points. This association provides the basis for a distance measure in the embedding space. A symmetric matrix $M_S$ can be derived from M as $M_S=D^{1/2}MD^{-1/2}$. Both M and $M_S$ have the same N eigenvalues $M_S=\Sigma_{k=0}^{N-1}\lambda_k\phi_k\phi_k^T$. The left and right eigenvalues of $M_S$ are $\phi_k=\phi_k D^{1/2}$ and $\Psi_k=\phi_k D^{-1/2}$, respectively, and $\langle\phi_k,\psi_{k'}\rangle=\delta_{kk'}$. Furthermore, for large values of $\epsilon$, all points in the graph are connected and $\lambda_0=1\geq\lambda_1\geq \ldots \geq\lambda_{N-1}\geq 0$. From equations (0.1) and (0.2), one can show that $$\lim_{t\to\infty} p(t,y \mid x_i) = \lim_{r\to\infty} e_i M^r = \phi_0(y) \quad (0.3)$$

where $$\phi_0(x_i) = \frac{D_i}{\sum_{j=1}^{N} D_j}$$

is the left eigenvalue of M with $\lambda_0=1$. The eigenvector $\phi_0(x)$ has the dual representation:

The stationary probability distribution on the curve, i.e., the probability of landing at location x after taking infinite steps of random walk (independent of initial position).

The density estimate at location x.

From equations (0.1) and (0.3) we have, for any finite time r:

$$p(t,y|x) = \phi_0(y) + \Sigma_{k=1}^{N-1} \psi_k(x) \lambda_k^r \phi_k(y) \quad (0.4)$$

where $\psi_k$ and $\phi_k$ are the right and left eigenvalues of the graph Laplacian M, respectively, and $\lambda_k^r$ is the $k^{th}$ eigenvalue (in descending order) of $M^r$. Under the interpretation of entries of the graph Laplacian as transition probabilities and the definition of a random walk, diffusion distance is defined as a distance measure at time t between two probability mass functions:

$$d_t^2(x_i, x_j) = \|p(t,y|x_i) - p(t,y|x_j)\|_w^2 = \Sigma_{y=x_i}^{xN}(p(t,y|x_i) - p(t, y|x_j))^2 w(y) \quad (0.5)$$

where is empirically chosen as $w(y) = 1/\phi_0(y)$.

A mapping between the original space and the embedding space can then be defined in terms of the first k eigenvalues:

$$\Psi^t(x) = (\lambda_1^t \psi_1(x), \lambda_2^t \psi_2(x), \ldots, \lambda_k^t \psi_k(x)). \quad (0.6)$$

The connection between the diffusion distance (0.5) and the diffusion map (0.6) is provided by the identity $$\|\Psi^t(x_i) - \Psi^t(x_j)\|^2 = \Sigma_{j=0}^{N-1} \lambda_j^{2r}(\psi_j(x_i) - \psi_j(x_j))^2 = d_t^2(x_i, x_j). \quad (0.7)$$

Consequently, the diffusion map $\Psi^t$ embeds the data into a Euclidean space in which the natural inner product is equal to the diffusion distance $d_t$. Furthermore, the diffusion distance can be approximated by retaining those terms for which the eigenvalues $\lambda_j^{2r}$ remain numerically significant.

The extraction of information that has value, or summary variables, within the context of a particular scope of operational objectives involves differentiating between information that is of no interest and that which has value to achieving an operational goal such as improving situational awareness or operational control.

In practice, the construction or identification of a model relating the information to the operational goal is advantageous. Conventional microscopic models that resolve every state variable are often of little practical use as the quantity of, largely irrelevant, information obscures the useful operational information while existing macroscopic models often lack the detail important to detect behaviors important to operational decisions. A model in terms of summary variables at a level of resolution between these two poles, a mesoscopic model, is disclosed. Thermodynamics is an example of the development and use of summary variables.

The approach extends to CPS with transactional dynamics, can handle large-scale data sets, and can provide an important contribution to the application of subspace embedding in real-world applications to CPS.

The fundamental difficulty associated with applying the techniques of symbolic dynamics to characterizing the dynamics of large scale complex systems is determining an appropriate partition of the phase space from which to extract the symbolic dynamics. This can be a nontrivial exercise for even low order systems and analytical solutions are known for only a handful of systems.

Traditionally, an experimental approach is used as the partitions for higher dimensional spaces often have a complicated structure, e.g., fractal boundaries. For large scale systems in particular, the process of determining an appropriate partition can be extremely computationally expensive. However, at least two things can mitigate the potential computational difficulties: 1) a lower dimensional space can often be considered, e.g., via a delay embedding, and 2) a useful encoding can typically be generated using a simple partition structure, e.g. a grid of cubic boxes of identical size.

The mesoscopic modeling approach can be illustrated using a simulated power system with four (4) machines and two (2) areas and using the small signal stability and transient stability test cases discussed supra. At an initial symbolic encoding step, information utilized to characterize the behaviors of the system can be embedded within the behavior of constituent subsystems and thus examining a subsystem is sufficient, e.g., a power system's behavior may be characterized using, for example, phasor measurement unit (PMU) data from a subset of measurement nodes.

Figure 4A:
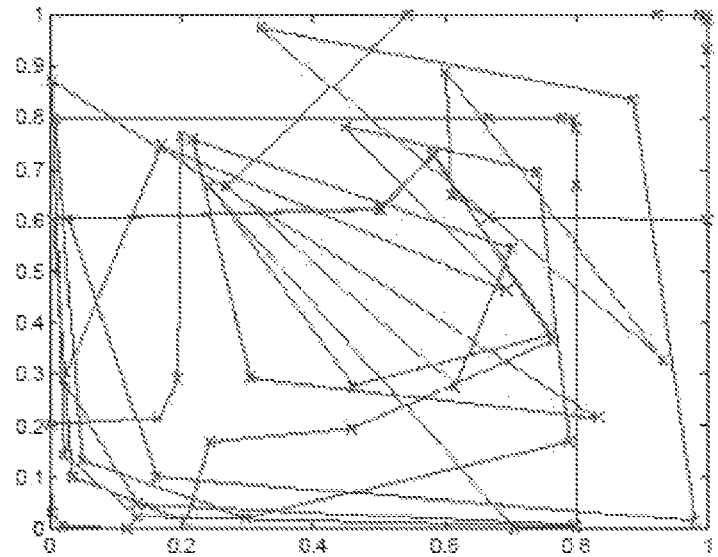
FIG. 4A is a graph illustrating an example Poincaré section in accordance with an embodiment of the disclosure.
Figure 4B:
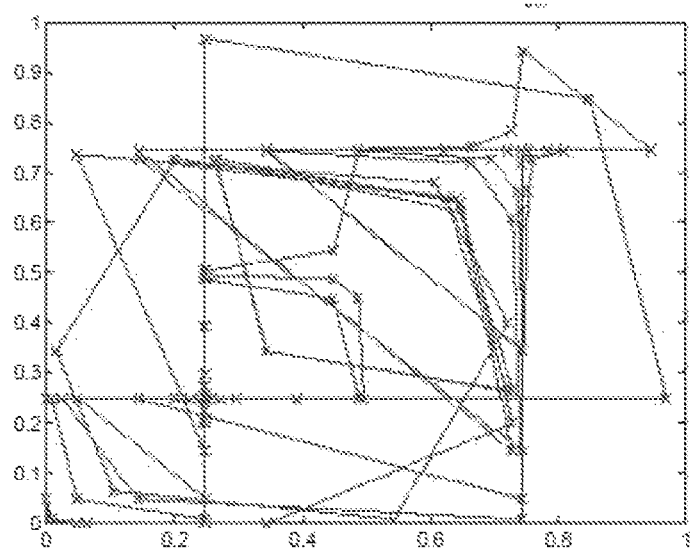
FIG. 4B is a graph illustrating an example Poincaré section in accordance with an embodiment of the disclosure.

Behaviors of a system can be resolved using measurements restricted to a subset of the machines. FIGS. 4A and 4B illustrate partitions obtained via the method of symbolic false nearest neighbors and the associated symbol strings are shown, embedded in the unit square. Inter-generator power angle measurements were obtained at buses G1, G2, and G3. The Poincaré sections, or partitions, illustrated in FIGS. 4A and 4B were obtained by sampling the phase angles of G1 and G2 using zero crossings of the derivative of the phase angle of G3 as a strobe. FIG. 4A is an illustration of normal, steady state behavior. FIG. 4B is an illustration of abnormal, transient behavior.

The symbol strings were then examined via an ϵ-Reconstruction process in order to construct probabilistic finite state automata (FSA) models of the symbolic dynamics, shown in FIGS. 5A and 5B. The probabilistic structure of the automata is described in the edge labels. In FIG. 5A, the FSA model has one vertex and a single loopback edge. The symbols that can be emitted on this transition are listed by the edge along with their probabilities of being emitted in parentheses.

In the small signal case shown in FIG. 5A, the system trajectory continuously loops back to a stable state while emitting random symbols. This is expected as the system is behaving normally about a stable equilibrium. The randomness of the emitted symbols is a direct consequence of the load perturbations.

A large signal case is shown in FIG. 5B where the resulting FSA displays the relevant characteristics possessing a state (1) with characteristic similar to that in the small signal case but with an additional state that captures the transient behavior induced by a fault. Note that the transitions between states (1) and (2) reflect the nature of the perturbation where the fault occurs once and is cleared well within a defined clearing time.

Figure 6:
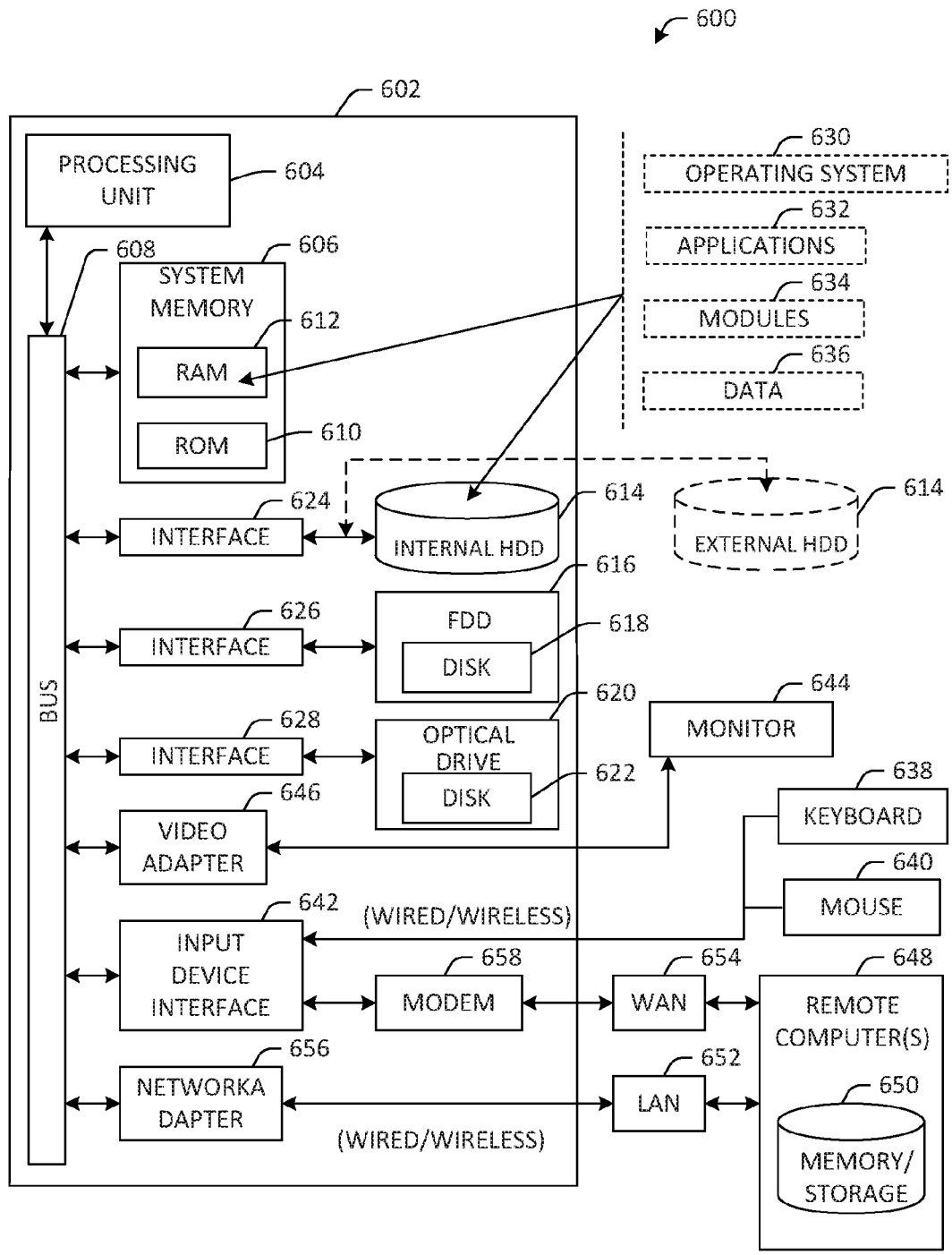
FIG. 6 is an illustration of an example computing environment where one or more of the provisions set forth herein are implemented, according to one or more embodiments.

Referring now to FIG. 6, there is illustrated a block diagram of a computer operable to execute the disclosed architecture. In order to provide additional context for various aspects of the subject innovation, FIG. 6 and the following discussion are intended to provide a brief, general description of a suitable computing environment 600 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be most any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects of the innovation includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 612, including an operating system 630, one or more application programs 632, other program modules 634 and program data 636. All or portions of the operating system, applications, modules, and/or data can also be cached in the RAM 612. The innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules or components depicted relative to the computer 602, or portions thereof, can be stored in the remote memory/storage device 650. The network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

What has been described above includes examples of the disclosure. It is, of course, not possible to describe every conceivable combination of components or methodologies for purposes of describing the subject innovation, but one of ordinary skill in the art may recognize that many further combinations and permutations of the innovation are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computer implemented method for detecting cyber physical system behavior, comprising:
utilizing one or more hardware processors and associated memory storing one or more programs for execution by the one or more hardware processors, the one or more programs including instructions for:
receiving data from a plurality of sensors associated with a cyber physical system, wherein the receiving the data includes receiving time series data from the plurality of sensors monitoring the cyber physical system and wherein the cyber physical system is an electrical power grid system;
constructing a metrization of the data utilizing a data structuring;
determining at least one ensemble and at least one summary variable from the metrized data, wherein the at least one summary variable is based on automata model utilizing a probabilistic grammatical inference that includes discovering common subtrees of a string parse tree via a nonparametric Bayesian clustering method including a Dirichlet Process or a Beta Process or a diffusion map technique;
applying a thermodynamic formalism to the at least one summary variable to classify a plurality of system behaviors;
identifying the plurality of system behaviors based at least in part on the classified plurality of system behaviors;
obtaining, by the one or more hardware processors, a baseline of the system behavior associated with the classified plurality of systems behaviors; and
detecting an anomalous condition based on a deviation of the plurality of system behaviors from the baseline.

2. The method for detecting cyber physical system behavior of claim 1, wherein the determining the at least one summary variable includes a symbolic encoding of the metrized data.

3. The method for detecting cyber physical system behavior of claim 1, wherein the probabilistic grammatical inference comprises an $\epsilon$-Machine Reconstruction statistical machine learning technique that includes describing a system trajectory as a string of symbols and describing system dynamics in terms of shift dynamics of the associated symbol string.

4. The method for detecting cyber physical system behavior of claim 3, including identifying cycles in strings of symbols utilizing pumping lemmas.

5. The method for detecting cyber physical system behavior of claim 1 further comprising:
generating an output indicating the identified plurality of system behaviors or the anomalous condition.

6. The method for detecting cyber physical system behavior of claim 1, wherein the at least one ensemble is determined empirically.

7. The method for detecting cyber physical system behavior of claim 1, wherein the applying the thermodynamic formalism includes applying thermodynamic techniques to the data received from the plurality of sensors.

8. The method for detecting cyber physical system behavior of claim 1, wherein the data structuring includes a manifold learning technique comprising at least one of a Diffusion Mapping, a bijective mapping or a spectral graph analysis.

9. The method for detecting cyber physical system behavior of claim 1, wherein the at least one summary variable is determined by forming a derivative of a natural variable.

10. The method for detecting cyber physical system behavior of claim 1, wherein detecting an anomalous condition includes at least one of predicting or detecting the presence of an Improvised Explosive Device.

11. A system for detecting cyber physical system behavior, comprising:
- a hardware processor and memory coupled to the hardware processor, the hardware processor executes the following executable components:
- a data collection component that receives encoded information from a plurality of sensors associated with a cyber physical system, wherein the encoded information includes time series data from the plurality of sensors monitoring the cyber physical system and wherein the cyber physical system is an electrical power grid system;
- a data assimilation component for decoding the encoded information, via a spectral graph analysis process comprising a diffusion mapping technique, by applying a manifold learning technique to the information to identify system features including at least one summary variable, wherein the data assimilation component applies a thermodynamic formalism to the at least one summary variable to obtain an indication of system behavior; and
- an operational component for receiving the indication of system behavior and for detecting an anomalous system behavior.

12. The system for detecting cyber physical system behavior of claim 11, wherein the encoded information includes at least one of continuous, discrete or transactional cyber physical system dynamics.

13. The system for detecting cyber physical system behavior of claim 11, wherein the operational component provides an output indicating the anomalous system behavior.

14. The system for detecting cyber physical system behavior of claim 11, wherein the data assimilation component utilizes the spectral graph analysis process that includes integrating data across at least one of a continuous physical domain or a discrete physical domains and at least one of a computational cyber domain or a transactional cyber domain.

15. The system for detecting cyber physical system behavior of claim 14, wherein the operational component is further configured to generate an output indicating the identified anomalous system behavior.

16. The system for detecting cyber physical system behavior of claim 11, wherein the data assimilation component utilizes a bijective mapping technique.

17. A non-transitory computer readable medium, comprising computer executable instructions that when executed by a hardware processor perform operations comprising:
- receiving data from a plurality of sensors associated with a cyber physical system, wherein the receiving the data includes receiving time series data from the plurality of sensors monitoring the cyber physical system and wherein the cyber physical system is an electrical power grid system;
- constructing a metrization of the data utilizing a data structuring;
- determining at least one ensemble and at least one summary variable from the metrized data, wherein the at least one summary variable is based on automata model utilizing a probabilistic grammatical inference that includes discovering common subtrees of a string parse tree via a nonparametric Bayesian clustering method including a Dirichlet Process or a Beta Process or a diffusion map technique;
- applying a thermodynamic formalism to the at least one summary variable to classify a plurality of system behaviors;
- identifying the plurality of system behaviors based at least in part on the classified plurality of system behaviors;
- obtaining, by the one or more processors, a baseline of the system behavior associated with the classified plurality of systems behaviors; and
- detecting an anomalous condition based on a deviation of the plurality of system behaviors from the baseline.

18. The non-transitory computer readable medium of claim 17, wherein the determining the at least one summary variable includes a symbolic encoding of the metrized data and wherein the probabilistic grammatical inference comprises an $\epsilon$-Machine Reconstruction statistical machine learning technique that includes describing a system trajectory as a string of symbols and describing system dynamics in terms of shift dynamics of the associated symbol string.

* * * * *